Jan. 30, 1945.                C. W. CLARK                  2,368,345
                             ELEVATING SCREW
                           Filed Dec. 6, 1943
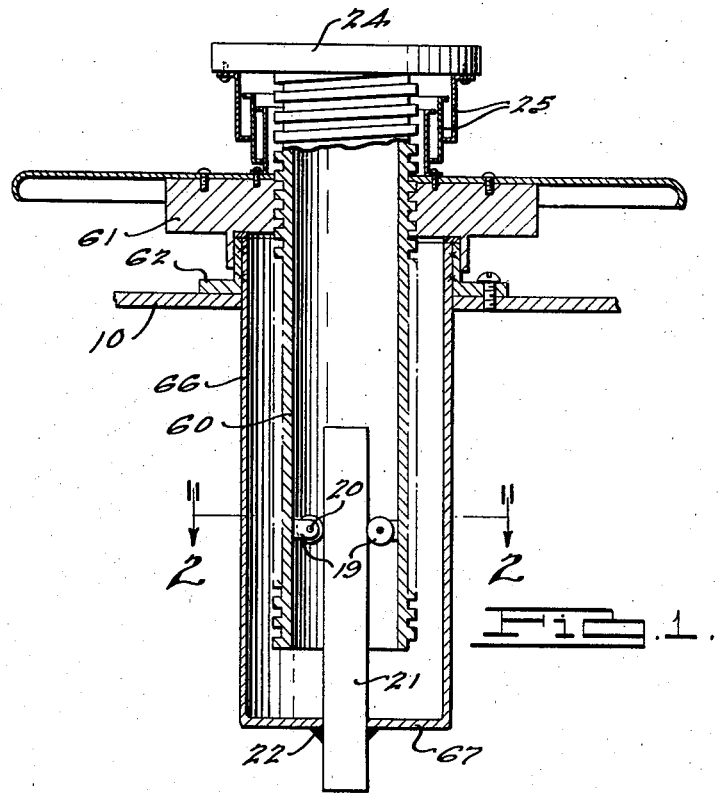
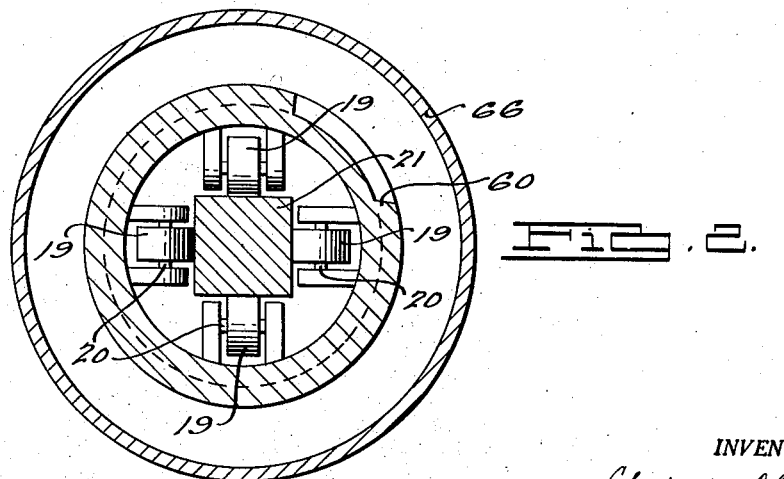
INVENTOR.
Clyde W. Clark
BY
Daniel G. Cullen
ATTORNEY.

Patented Jan. 30, 1945

2,368,345

UNITED STATES PATENT OFFICE 2,368,345

ELEVATING SCREW

Clyde W. Clark, Dearborn, Mich.

Application December 6, 1943, Serial No. 513,107

4 Claims. (Cl. 74—424.8)

This application relates to elevating screws.

An elevating screw is useful in a testing machine, such as a hardness tester disclosed in my prior Patent No. 2,319,208 of May 18, 1943, for raising and lowering a work piece to a testing element.

In presently known machines, the elevating screw is disposed within a vertically mounted tube fixed in a hole of the machine base; the lower end of the tube is closed, and the upper end of the tube journals and is closed by an elevating nut through which the screw passes, so that the lower end of the screw is within the tube, and the upper end of the screw is exposed. In some of these machines, now known, a long external groove or key way is cut in the outside of the screw to cooperate with a key within the tube, whereby, as the elevating nut is rotated, the screw is raised or lowered, its rotation being prevented by the key of the tube and the external key way of the screw.

An objection I have against such construction is that the external groove or key way in the screw provides a communicating path into the tube, whereby dirt and dust and foreign objects may find their way into the tube and interfere with smooth operation of the elevating screw.

In this application I have disclosed an elevating screw assembly wherein there exists no communicating path into the interior of the tube.

An embodiment of my invention is shown in the appended drawing.

In this drawing,

Fig. 1 is a sectional view in elevation.

Fig. 2 is a section as if on line 2—2 of Fig. 1.

Referring to the appended drawing, it will be seen that Fig. 1 shows a base 10 to which is fastened a collar 62 which is fastened securely around the upper end of a tube 66 whose lower end is closed by a closure plate 67 and whose upper end journals an elevating nut 61 formed as a hand wheel. Threaded through the threaded hole of the elevating nut is a hollow screw 60 near whose lower end are fixed rollers 19, mounted on pins 20, through which is passed a squared rod 21 projecting through the closure plate 14 and welded thereto, as at 22.

The upper end of the screw is closed and formed as an anvil 24 which carries a series of telescoping rings 25, whereby that portion of the screw which projects above the elevating nut to varying heights, is at all times shielded by the telescoping rings.

The squared rod 21 is in the nature of a key or trackway fixed to the tube and the squared clearance between the rollers 19, fixed to the screw, is a squared internal key way or guide for the screw. The portions 19 and 21, therefore, provide a frictionless guide and internal trackway for the screw and the tube whereby they are held against relative rotation while longitudinal movement of the screw relative to the tube is permitted and guided frictionlessly, such longitudinal movement being caused by the rotation of the elevating nut.

An important characteristic of the construction herein disclosed is the absence of a communicating path into the interior of the tube. In presently known constructions, the long external groove or key way cut in the screw necessarily extends above and below the elevating nut and consequently provides a communicating path into the interior of the tube which permits dust and dirt and other foreign matter to enter the tube. This has been eliminated by the construction herein disclosed.

Now having described such construction, reference should be had to the claims which follow.

I claim:

1. An elevating screw assembly comprising a base, an open top end and closed bottom end tube vertically mounted therein and fixed against movement with respect thereto, a non-circular trackway disposed within the tube and fixed to its lower end closure and projecting upwardly therefrom, an elevating screw within the tube surrounding the trackway and having a non-circular clearance through which the trackway passes, whereby the screw and the tube are held against relative rotation, while longitudinal movement of the screw relative to the tube is permitted, and a rotatable elevating nut threaded on the screw and mounted to rotate with respect to the base but not to move axially of the screw with respect to the base, for causing the screw to rise or fall as the nut is rotated, the tube containing a lubricant for the screw.

2. An elevating screw assembly comprising a base, an open top and closed bottom end tube vertically mounted therein and fixed against movement with respect thereto, an elevating screw within the tube, and means providing an internal guide for the screw and a trackway for the tube, whereby the screw and the tube are held against relative rotation, while longitudinal movement of the screw relative to the tube is permitted and a rotatable elevating nut threaded on the screw and mounted to rotate with respect to the base but not to move axially of the screw with respect to the base, for causing the screw to rise or fall as the nut is rotated, the tube containing a lubricant for the screw.

3. An elevating screw assembly comprising a base, an open top and closed bottom end tube vertically mounted therein and fixed against movement with respect thereto, an elevating screw within the tube, and means providing an internal guide for the screw and a trackway for the tube, whereby the screw and the tube are held against relative rotation, while longitudinal movement of the screw relative to the tube is permitted and a rotatable elevating nut threaded on the screw and mounted to rotate with respect to the base but not to move axially of the screw with respect to the base, for causing the screw to rise or fall as the nut is rotated, the tube containing a lubricant for the screw, the elevating nut forming a closure for the upper end of the tube.

4. An elevating screw assembly comprising a base, an open top end and closed bottom end tube vertically mounted therein and fixed against movement with respect thereto, a non-circular trackway disposed within the tube and fixed to its lower end closure and projecting upwardly therefrom, an elevating screw within the tube surrounding the trackway and having a non-circular clearance through which the trackway passes, whereby the screw and the tube are held against relative rotation, while longitudinal movement of the screw relative to the tube is permitted, and a rotatable elevating nut threaded on the screw and mounted to rotate with respect to the base but not to move axially of the screw with respect to the base, for causing the screw to rise or fall as the nut is rotated, the tube containing a lubricant for the screw, the elevating nut forming a closure for the upper end of the tube.

CLYDE W. CLARK.